A. AUSTIN.
RESILIENT VEHICLE WHEEL.
APPLICATION FILED MAR. 31, 1921.
1,427,570.
Patented Aug. 29, 1922.
2 SHEETS—SHEET 1.
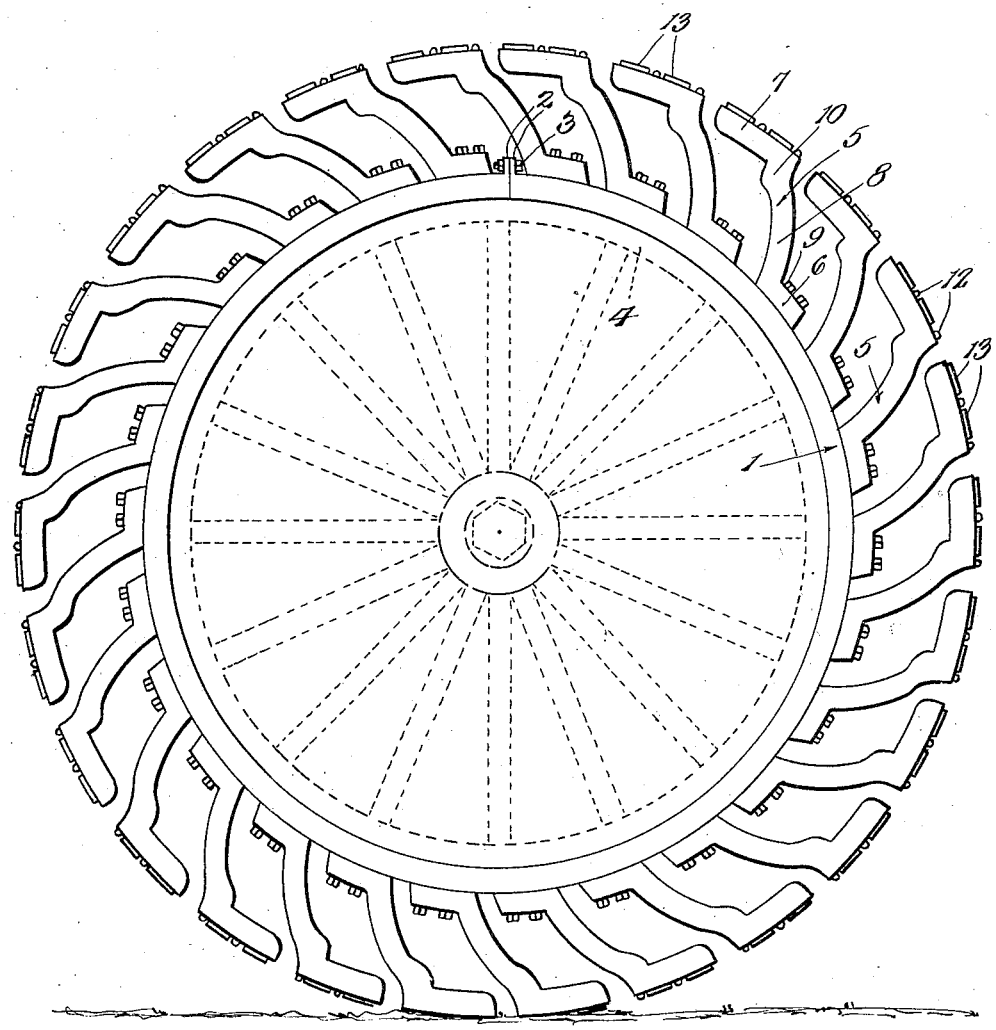
Inventor
A. Austin.
By Lacey & Lacey, Attorneys

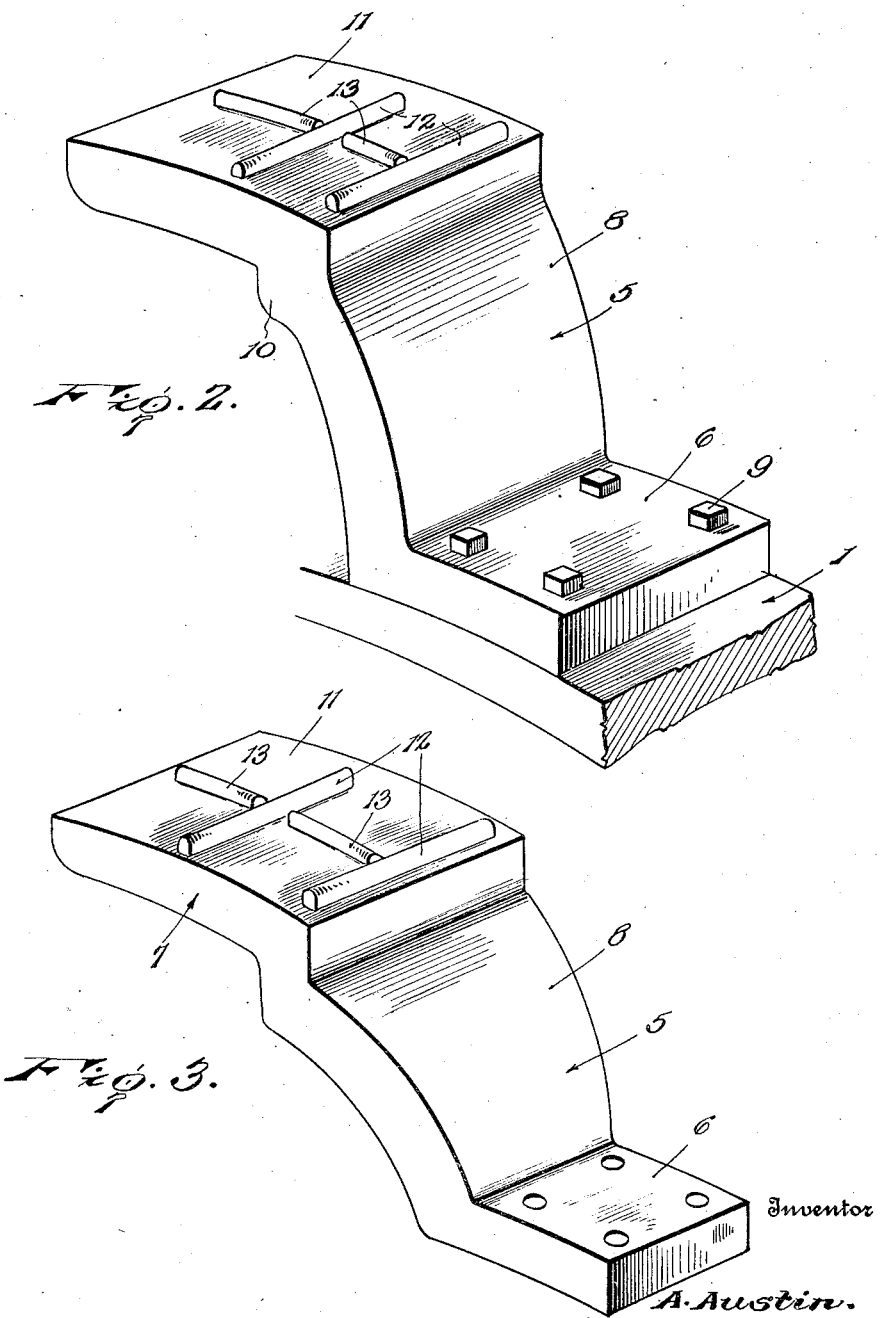

UNITED STATES PATENT OFFICE.

ADELBERT AUSTIN, OF GREENWOOD, NEW YORK.

RESILIENT VEHICLE WHEEL.

1,427,570.   Specification of Letters Patent.   Patented Aug. 29, 1922.

Application filed March 31, 1921. Serial No. 457,390.

*To all whom it may concern:*

Be it known that I, ADELBERT AUSTIN, citizen of the United States, residing at Greenwood, in the county of Steuben and State of New York, have invented certain new and useful Improvements in Resilient Vehicle Wheels, of which the following is a specification.

This invention relates to resilient vehicle wheels and has as its object to provide a wheel or more particularly a rim for a vehicle wheel embodying resilient tread members imparting to the wheel substantially the same degree of resiliency as presented by a pneumatic tire but presenting none of the disadvantages of such a tire.

Another object of the invention is to provide a rim having a resilient tread and which rim may be applied to the ordinary vehicle wheel, the members comprising the tread being independently secured to the rim of the device whereby any one of the members may be removed and replaced in the event it becomes damaged or broken.

A further object of the invention is to so form the tread members as to effectually provide against skidding.

In the accompanying drawings:

Figure 1 is a side elevation of the cushioning device embodying the present invention.

Figure 2 is a detail perspective view illustrating one of the tread members and the portion of the rim to which it is secured.

Figure 3 is a perspective view illustrating a modified form of tread member.

The device embodying the invention consists essentially of a rim and a circumferential series of resilient tread members secured thereon, and in the drawings the rim is indicated in general by the numeral 1 and the same is preferably in the form of an annular band open at a point in its circumference and provided at its ends with ears 2 through which may be secured bolts 3 for the purpose of closing the rim about the felly of a wheel which is shown in dotted lines in Figure 1 of the drawings and indicated by the numeral 4 and which may be a wheel of any ordinary construction or one specially constructed for the purpose if found desirable.

The tread members are indicated in general by the numeral 5 and are formed of resilient metal and each member comprises an attaching base 6, a tread shoe 7, and a shank 8 extending between and connecting the attaching base and shoe. The base 6 is slightly curved to conform to the curvature of the rim 1 and is secured removably upon the rim by bolts or other suitable fastening devices 9. The shank 8 is curved upwardly from one side of the attaching base 6 in the direction opposite the direction of rotation of the wheel when the vehicle is travelling forwardly, and the said shank supports at its upper end the tread shoe 7, the shoe being preferably integral with the outer end of the shank and the parts at their juncture being reinforced by thickening the material, as at 10, along a transverse line at the inner side of the connected portions of the shank and shoe. The shoe 7 has a tread face indicated by the numeral 11 which face may be curved concentric to the axis of the wheel and thus the tread faces of all of the shoes throughout the entire series of tread members will touch a circle concentric to the axis of the wheel. The tread face 11 of each shoe is preferably formed in a manner to provide against skidding and for this purpose may be provided with transversely extending ribs 12 and other ribs 13 which extend longitudinally of the said face and consequently in a circumferential direction with relation to the wheel, the ribs 12 being preferably relatively spaced and the ribs 13 extending at right angles thereto. These ribs may be of any desired number and may be arranged in some other manner if desired although the arrangement illustrated is an effectual one in preventing skidding of the wheel and providing for the desired tractive engagement of the wheel with the road surface.

The tread members are so arranged that they are mutually spaced from one another throughout the entire series, and the free end of each shoe 7 will thus be spaced from and located opposite to the inner end of the next adjacent shoe in the series. Thus no resistance is offered to the inward yielding of the shoes as they come into contact with the road surface except the yielding resistance afforded by the resilient shanks 8.

In that form of the invention shown in Figures 1 and 2 of the drawings, the shank 8 of each tread member is of the same width as the shoe 7 and likewise the attaching base 6 is of a width equal to the width of the shank 8, but in the form illustrated in Figure 3 the attaching base may be narrower than the shoe if found desirable, and the shank may be gradually narrowed from the shoe to the base, this form being especially designed for use in connection with lighter types of vehicles.

It will be noted that the shank is curved uniformly to a point within a short distance of the shoe whence it is reversely curved providing a transverse recessed portion adjacent the end of an adjacent shoe. If the wheel should be subjected to abnormal strain, the free end of one shoe may enter the transverse recessed portion of the next adjacent shoe and will not ride on and overlap said adjacent shoe, the result being that the ground-engaging surfaces of the shoes will remain substantially flush and a continuous uninterrupted tread will be produced.

Having thus described the invention, what is claimed as new is:

In a device of the class described, the combination of a rim, and a plurality of resilient tread members arranged in a circumferential series about the rim and each comprising an attaching base secured to the rim, a shoe member, and a resilient shank connecting the base and the shoe member, the shank being curved uniformly to within a short distance of the shoe and then curved reversely providing a recessed portion adjacent the end of an adjacent shoe.

In testimony whereof I affix my signature.

ADELBERT AUSTIN. [L. S.]